United States Patent [19]
Graham et al.

[11] 3,780,807
[45] Dec. 25, 1973

[54] GRAVEL-PACKING METHOD AND COMPOSITION

[75] Inventors: John W. Graham, Alvin; Wynn P. Rickey, Houston, both of Tex.

[73] Assignee: Esso Production Research Company, Houston, Tex.

[22] Filed: Sept. 13, 1972

[21] Appl. No.: 288,859

[52] U.S. Cl. .............................. 166/278, 166/280
[51] Int. Cl. ........................................... E21b 43/04
[58] Field of Search.................... 166/278, 276, 279, 166/308, 280, 305 R; 252/448, 449; 65/21

[56] References Cited
UNITED STATES PATENTS

| | | |
|---|---|---|
| 3,274,888 | 9/1966 | Vanstrum et al. ............... 65/21 UX |
| 3,336,979 | 8/1967 | Ingraham et al. ................ 166/280 X |
| 3,353,601 | 11/1967 | Dollarhide et al. .............. 166/280 X |
| 3,376,930 | 4/1968 | Kiel et al. ............................ 166/280 |
| 3,548,942 | 6/1969 | Terry ................................... 166/276 |

*Primary Examiner*—Stephen J. Novosad
*Attorney*—James A. Reilly et al.

[57] ABSTRACT

A well is gravel packed by injecting a fluid suspension of coarse particles having fine grains of sand or similar material bonded to their outer surfaces. The composite particles thus employed readily bridge together to form a bed which is capable of withstanding relatively high differential pressures.

12 Claims, No Drawings

GRAVEL-PACKING METHOD AND COMPOSITION

BACKGROUND OF THE INVENTION

1. Field of the Invention

This invention relates to the gravel packing of oil wells, gas wells, and similar boreholes and is particularly concerned with improved materials for use in gravel packing and similar operations.

2. Description of the Prior Art

Gravel packing is widely used for controlling the production of sand from oil wells, gas wells, and similar boreholes. This normally involves the injection of a fluid suspension of sand, gravel, or similar particles into the well to form a bed of solids containing small openings over which the formation sand will bridge. In some cases, the injected particles are held in place by means of a slotted liner or screen through which fluids produced into the well must pass but in other instances such a screen or liner is not used. Instead, fluid containing the suspended particles is injected through perforations in the casing into a cavity surrounding the casing string. Fluid is then produced back into the wellbore until the injected solids have bridged across the perforations and solid particles are no longer produced. This latter technique requires the use of carefully graded sand or gravel and painstaking injection procedures. Failures due to improper placement or shifting of the bed in response to changes in the production rate, pressure surges during workover operations, or the like normally require that the well be cleaned out and repacked. Since this is time consuming and expensive, other techniques are often used in preference to those described above.

SUMMARY OF THE INVENTION

This invention provides an improved gravel packing technique which at least in part alleviates the difficulties referred to above. In accordance with the invention, it has now been found that the use of coarse particles of sand, gravel, glass, ceramic, or the like having fine particles of a similar material bonded to their outer surfaces with an epoxy resin, a phenol formaldehyde resin, a waterproof glue, or a similar bonding agent permits the formation of interlocking gravel packs which will firmly bridge across perforations and other openings and are capable of withstanding relatively high differential pressures due to fluid flow through porous spaces between the particles. Tests have shown that these composite particles will bridge more quickly than ordinary sand and similar materials employed in the past for gravel packing purposes, that they are capable of withstanding high pressures across openings of relatively large size without unduly obstructing fluid flow, and that bridges formed with the particles can be readily disrupted and reformed as desired. These and other advantages make the composite particles of the invention useful in a variety of different well workover and completion operations.

The composite particles can be readily prepared in a variety of different ways. A preferred procedure is to wet the coarse particles to which the fine granules are to be bonded with an epoxy resin solution or similar bonding agent, heat the wetted particles until the bonding agent begins to set, mix in an excess of the finer particles, and then agitate the mixture until the bonding agent has hardened and the fine particles are firmly held in place. The resulting material can then be screened to eliminate undersized or oversized particles and bagged for future use.

The procedures employed for replacement of the composite particles to form a gravel pack or similar particulate bed within a wellbore or surrounding formation will depend in part upon the particular well arrangement and the purpose for which the bed of particles is intended. In a gravel packing operation in which a bed of particulate solids is to be placed in a cavity surrounding a perforated casing string, for example, the composite particles will normally be suspended in a fluid of sufficient viscosity to prevent excessive settling in a concentration between about 1 and about 5 pounds per gallon and injected through the perforations into the cavity until the pressure buildup and volume of fluid injected indicate that the cavity has been substantially filled with solid particles. Thereafter, the pressure can be released and the well swabbed if necessary to start flow in the opposite direction and cause the particles to bridge across the casing perforations. The movement of formation sand into position behind the bed of particles results in the formation of a rigid, tightly packed bed which will normally remain in place even though fluids are produced through it at relatively high rates. Methods which are generally similar to this can be employed for placing the composite particles about screens and liners in wellbores, for the placement of particles during hydraulic fracturing operations, and for depositing particulate solids during other well workover and completion operations. Regardless of the particular type of operation contemplated, use of the composite particles will normally permit the formation of a more rigid, tightly packed bed than can be obtained with sand and similar materials employed heretofore.

DESCRIPTION OF THE PREFERRED EMBODIMENTS

The composite particles employed for purposes of this invention include hard, rigid, generally spheroidal core particles of a material which is substantially inert to crude oil, natural gas, water, brine, and other fluids naturally found in subterranean formations. The preferred materials for most applications are naturally occurring minerals, such as quartz, jasper, agate, chalcedony, corundum, garnet and the like, which have Mohs hardness values greater than about five and one-half and are found in stream beds or alluvial deposits in the form of smooth, rounded particles. In lieu of these naturally occurring materials, manufactured materials, such as tempered glass, ceramics and metallic alloys, which have similar hardness values and can be produced in particulate form can in some cases also be employed.

The core particles selected will normally range between two and one-half and about 40 mesh on the U.S. Sieve Series Scale in size. Particles between about 4 and about 20 mesh are normally preferred. The size chosen will depend in part upon the density of the material making up the particles and the particular application for which they are intended. It is generally advantageous to employ relatively large particles falling within a narrow size range and hence core particles of from about 4 to 6 mesh, 6 to 8 mesh, 8 to 12 mesh, or 10 to 20 mesh will generally be used.

The smaller particles which are bonded to the surfaces of the core particles to form the composite particles of the invention will normally be of the same material as the core particles and will generally range between about 10 and about 325 mesh on the U. S. Sieve Series Scale. The size selected will depend, of course, in part upon the size of the core particles employed. In general, the diameters of the smaller particles should be from about one-fourth to about one-twentieth the diameters of the core particles selected. A typical composite particle, for example, may have a core between about 6 and about 8 mesh in size and have particles between 40 and 60 mesh bonded to the surface of the core to produce a product in the 4 to 8 mesh range. In this case, the smaller particles will have an average diameter about one-eighth that of the core particles. Again it is preferred that the smaller particles be screened to a relatively narrow size range such as 10 to 20 mesh, 20 to 40 mesh, 40 to 60 mesh, 100 to 200 mesh, or the like.

A variety of different bonding agents which will adhere to the particles selected and are substantially inert to crude oil, natural gas, water, brine, and other fluids normally found in subterranean formations after they have set may be used for bonding the smaller particles to the core particles. The preferred materials are generally synthetic resins such as epoxy resins, phenol-formaldehyde resins, furfuryl alcohol resins, and the like. Other materials which may in some cases be used include waterproof glues, shellacs, varnishes, polyisobutylene formulations, and the like. Many commercially available materials used for bonding glass, metals, ceramics, and similar materials can be employed for purposes of the invention and will readily suggest themselves to those skilled in the art. Silane coupling agents can be used with the bonding agents to improve wetting of the particles if desired.

The composite particles used for purposes of the invention can be readily prepared in a number of different ways. A preferred procedure is to first wet the core particles to be employed with a low viscosity epoxy resin solution or other bonding agent, drain off the excess solution, and then add an excess of the smaller particles after the bonding agent begins to gel or get tacky. The mixture of wetted core particles and smaller particles is thoroughly stirred or agitated to break up any aggregates of the core particles and coat each wetted core particle with the smaller granules. The mixing and agitation of the particles can be carried out in a ribbon mixer or similar device if desired. Depending upon the particular resin or other bonding agent selected, the particles can also be heated to accelerate drying and setting of the bonding agent. As the bonding agent dries, it bonds the smaller particles in place to the surfaces of the larger core particles to produce composite particles suitable for purposes of the invention. These composite particles can then be screened to eliminate undersized or oversized composites and then employed in well completion and workover operations.

The improved results obtainable with the composite particles of the invention are illustrated by the results of laboratory tests carried out with particles produced from quartz sand. These composite particles were produced by wetting 3 pounds of 6 to 8 mesh quartz sand with an epoxy resin formulation prepared from 235 grams of an epoxy resin marketed by Ciba Products Company as "Epoxy 6005," 32.9 grams of meta-phenylene diamine as a catalyst, and 2.35 grams of beta 3,4 (epoxy cyclohexyl) ethyltrimethoxy-silane as a coupling agent designed to insure wetting of the sand particles. The excess epoxy resin solution was drained from the sand particles and the particles where then placed in an oven heated to 275°F. After the resin began to gel, an excess of 40 to 60 mesh quartz sand was added to the wetted particles and thoroughly mixed with them. Intermittent agitation of the particles was continued until the resin had set and the smaller particles were firmly bonded to the larger core particles. The resulting composite particles were then screened to a 4 to 6 mesh on the U. S. Sieve Series Scale.

Following preparation of the composite particles as described above, the product was tested in a flow cell by placing the particles above a 0.5 inch diameter smooth, conical perforation located within the cell. Water was then pumped through the sand and perforation in the cell. The flow rate was increased stepwise until a rate of 321 barrels per day had been obtained. At this point, the differential pressure across the bed of composite particles was 105 pounds per square inch. No sand particles were produced through the perforation at any time, demonstrating that the particles firmly bridged together and were capable of withstanding high pressures across a perforation of relatively large diameter. The flow through the test cell was then reversed to disrupt the bridge. The bed of particles was readily dislodged by fluid passing through the perforation and particles in the reverse direction. After disruption of the bridge, normal flow was reinstated. The composite particles again bridged across the perforation immediately and again formed a bed capable of withstanding high differential pressures without unduly restricting the flow rate. Other laboratory work showed that the composite particles would bridge across a 0.625 diameter opening much more readily than would uncoated sand of the same mesh size.

As indicated earlier, the composite particles are particularly useful in gravel packing operations in which a bed of particulate solids must be placed in a cavity surrounding a perforated casing string or the like. In a typical operation of this type, the composite particles will normally be suspended in a mud or similar fluid having sufficient viscosity to retard settling at excessive rates and then injected into the cavity until the pressure buildup and volume of fluid pumped indicate that the cavity has been substantially filled with the particles. The particle size selected and the concentrations used will depend in part upon the size of the perforations in the casing but particles between about 4 and about 20 mesh will normally be used in concentrations between about one and about five pounds per gallon. After the required quantity of solids has been injected, the pressure will be released. As fluids flow back into the wellbore, the injected particles will bridge across the perforations to form a rigid, tightly packed bed. The well can be swabbed to start fluid flow if necessary. The movement of formation sand into position behind the particles will strengthen the bed and prevent further particle movement with changes in flow rate or reversals in flow through the bed. Formation fluids can thereafter be produced through the bed at relatively high rates with little danger of producing the injected particles or formation sand. Procedures generally similar to these can be used for the placement of beds about screens and liners in wellbores, for the depositing of particles in fractures during hydraulic fracturing operations, and in other well workover and completion operations which call for the placement of solid particles in a subterranean formation. Such procedures will be familiar to those skilled in the art.

We claim:

1. A method for the placement of a bed of solid particles in a subterranean formation penetrated by a wellbore which comprises preparing a fluid suspension of composite particles having hard, rigid, generally spheroidal cores of a material substantially inert to fluids naturally present in subterranean formations, a coating of a bonding agent substantially inert to such fluids on the surfaces of said cores, and a plurality of smaller particles of said material bonded to said cores by said bonding agent, said cores being between about two and one-half and about 40 mesh on the U. S. Sieve Series Scale in size and said smaller particles being between about 10 and about 325 mesh in size and having average diameters between about one-fourth and about one-twentieth the diameters of said core particles, and thereafter injecting said fluid suspension into said formation via said wellbore.

2. A method as defined by claim 1 wherein said fluid suspension is injected into a cavity in said formation through perforations in a string of casing in said wellbore.

3. A method as defined by claim 1 wherein said fluid suspension is injected into a fracture in said formation.

4. A method as defined by claim 1 wherein said cores and said smaller particles are sand particles.

5. A method as defined by claim 1 wherein said bonding agent comprises an epoxy resin solution.

6. A method as defined by claim 1 wherein said bonding agent includes a silane coupling agent.

7. A composite particle for use in well completion and workover operations which comprises a hard, rigid, generally spheroidal core particle of a material substantially inert to fluids naturally present in subterranean formations, said core particle being between about two and one-half and about 40 mesh on the U. S. Sieve Series Scale in size; a coating of a bonding agent substantially inert to fluids naturally present in subterranean formations on the surface of said core particle; and a plurality of smaller particles of said material bonded to said core particle by said bonding agent, said smaller particles being between about 10 and about 325 mesh on the U. S. Sieve Series Scale in size and having diameters between about one-fourth and about one-twentieth the diameter of said core particle.

8. A composite particle as defined by claim 7 wherein said material comprises quartz.

9. A composite particle as defined by claim 7 wherein said material comprises tempered glass.

10. A composite particle as defined by claim 7 wherein said bonding agent comprises a phenolic resin.

11. A composite particle as defined by claim 7 wherein said bonding agent comprises an epoxy resin.

12. A composite particle as defined by claim 7 wherein said bonding agent includes a silane coupling agent.

* * * * *